United States Patent Office 3,803,206
Patented Apr. 9, 1974

3,803,206
PROCESS FOR PURIFYING ADIPONITRILE
CONTAINING OXIDIZABLE IMPURITIES
Kenji Nishimura, Shinichi Furusaki, Kazuo Kuniyoshi, and Kazuo Hashimoto, Ube, Japan, assignors to Ube Industries Ltd., Ube-shi, Japan
No Drawing. Filed July 21, 1972, Ser. No. 273,858
Claims priority, application Japan, July 28, 1971, 46/55,983
Int. Cl. C07c *121/10, 121/26*
U.S. Cl. 260—465.2
4 Claims

ABSTRACT OF THE DISCLOSURE

A process for purifying adiponitrile containing impurities oxidizable with potassium permanganate, which comprises treating the adiponitrile with 1 to 3 mols of nitrogen peroxide based on each mole of potassium permanganate consumption of the adiponitrile at a temperature of from room temperature to 180° C., and thereafter recovering purified adiponitrile by distillation.

---

This invention relates to an improved process for purifying adiponitrile containing impurities oxidizable with potassium permanganate using a gaseous treating agent. More specifically, the invention relates to an improved method of purifying crude adiponitrile, in which the desired treatment can be performed at low temperatures within shortened periods of time in the complete absence of a catalyst without inducing hydrolysis which is detrimental to adiponitrile. Since temperatures over a wide range from low to high can be employed, this treatment which involves an exothermic reaction does not give adverse effects even when the temperature changes from place to place in the treating zone. It is extremely easy to control the treating temperature, and no complicated control means is required.

Especially, the present invention relates to a process for purifying adiponitrile containing impurities oxidizable with potassium permanganate using a gaseous treating agent which is advantageous industrially with respect to operation and equipment, which comprises treating the adiponitrile with 1 to 3 mols of nitrogen peroxide based on each mole of potassium permanganate consumption of the adiponitrile, at a temperature of from room temperature to 180° C., and thereafter recovering the purified adiponitrile by distillation.

Adiponitrile is a material for the production of hexamethylene diamine, and one of the important intermediates for the production of polyamides. In order to use it for this purpose, it must be thoroughly purified by separating and removing impurities contained therein. Crude adiponitrile produced industrially contains impurities which are extremely difficult to separate and remove by distillation. One of these impurities is 1-imino-2-cyanocyclopentane (to be referred to simply as cyanoimine hereinbelow), which is an intramolecular cyclized product of adiponitrile and one of the potassium permanganate consuming substances to be described. It is well known that these substances should be removed from crude adiponitrile, and various attempts have been made to separate and remove them.

Of the purifying methods proposed heretofore, physical methods include rectification, crystallization, adsorption and ion-exchange. In order to obtain satisfactory results, these physical methods require a very large scale equipment and a complicated procedure. Usually, therefore, it is advantageous to employ chemical methods conjointly. Thus, treating reagents for decomposing the impurities or converting them to other compounds that can be readily separated have been proposed. For example, a method of treating crude adiponitrile with sulfuric acid, hydrochloric acid, nitric acid, phosphoric acid or hydrocyanic acid has been proposed, and a method of treating crude adiponitrile with a bisulfite, bisulfate, neutral ammonium salt, bichromate, permanganate, hydroxylamine salt, isocyanate, hydrazine or formalin has also been proposed. However, since all these reagents are liquid or solid under the treating conditions, extra work such as the removal of excessive reagents or the separation of the precipitate are required, and the loss of adiponitrile owing to dissolution and adhesion cannot be avoided.

One known method of using a liquid or solid treating agent is disclosed in U.S. Pat. 2,920,099 in which nitric acid is used as the treating agent. The patent discloses that temperatures of 60–150° C. can be employed, but the normal operating temperature is 85 to about 125° C., preferably 95 to about 115° C. In fact, in order to obtain satisfactory treating effects without inducing hydrolysis which is detrimental to adiponitrile, the treating temperature should be adjusted to about 100° C. The temperature of the material to be treated should be controlled carefully within a very narrow range by complicated equipment and procedure. In addition, this method suffers from the many defects mentioned above which are ascribable to the liquid treating agent.

In an attempt to remedy these defects due to the use of liquid or solid treating agents under the above-mentioned treating conditions, the use of a gaseous treating agent has been proposed.

One known method of using a gaseous treating agent is disclosed in Japanese patent publication No. 3047/1971 corresponding to German patent application P 16 68 837.2 filed Dec. 23, 1967 which describes the treatment of adiponitrile with molecular oxygen or a gas containing molecular oxygen. The Japanese patent publication discloses that since at low temperatures, the treatment cannot be carried out at a practical rate of reaction, it should be effected at a temperature of at least 100° C., preferably 160 to 170° C., and that when the treatment is carried out at this temperature for about 8 hours, the cyanoimine content of adiponitrile, which is 1 to 2%, can be reduced to 400–600 p.p.m. In order to carry out feasible treatment at lower temperature, for example 110–140° C. it is necessary to use a catalyst. It is further stated in this Japanese patent publication that in order to perform the treatment at the above-mentioned temperatures for a reasonable period of time, complicated and disadvantageous additional measures such as the use of a catalyst or the employment of elevated pressures are required. In addition to these disadvantages, this method does not produce sufficient effect in removing and separating potassium permanganate consuming substances other than cyanoimine. Especially when the starting adiponitrile contains much impurities, it is necessary to repeat this treatment procedure.

Canadian Pat. Nos. 628,059 and 672,712 propose treatment with ozone. As will be readily understood from the properties of ozone, these methods must be carried out at relatively low temperatures for example 20 to 50° C., and temperatures over a wide range cannot be employed. Accordingly, this treatment, which involves an exothermic reaction, cannot be free from the disadvantages of requiring complicated temperature control with respect to operation and equipment. Furthermore, ozone involves more risk in handling than oxygen, and complicated care must be exercised in handling this treating agent.

Extensive work has led to the discovery that the use of nitrogen peroxide serves to overcome the disadvantages of the conventional technique of using a gaseous treating agent. It has also been found that as the nitrogen peroxide, both an equilibrium mixture expressed by

and an equilibrium mixture expressed by $$N_2O_3 \rightleftarrows NO + NO_2$$

can be used, but that only $NO_2$ contributes to the treating effect and NO does not exhibit a feasible effect.

Accordingly, it is an object of this invention to provide a process for purifying adiponitrile containing impurities oxidizable with potassium permanganate using a gaseous treating agent which is commercially more advantageous than the liquid or solid treating agent used in the conventional method, which can bring about superior purifying effects by eliminating the difficulties of the prior method which use a gaseous treating agent.

Many other objects of this invention and their advantages will become clear from the following description.

In the present invention, nitrogen peroxide is used as the treating agent. Such treating agent may be a gas containing nitrogen dioxide gas, for example, an equilibrium mixture by $2NO_2 \rightleftarrows N_2O_4$, an equilibrium mixture expressed by $N_2O_3 \rightleftarrows NO + NO_2$, a mixture of these equilibrium mixtures, or any of these gases diluted with an inert gas such as nitrogen gas or argon gas to a suitable concentration. For example, it may be nitrose gas obtained commercially by the vapor phase oxidation of ammonia.

The treating system need not be completely free from water. But since the presence of water in a substantial amount reduces the treating effect by nitrogen peroxide, it is preferred that the treatment be carried out in the substantial absence of water. For example, a small amount (less than 1% by mol, for example, about 0.5% by mol) of water usually contained in nitrose gas commercially produced is permissible. In the case of a mixture expressed by $2NO_2 \rightleftarrows N_2O_4$, the presence of a very small amount of water of less than 10 mol percent, for example about 5 mol percent, is permissible.

The preferred amount of nitrogen peroxide is 1 to 3 mols, based on each mol of potassium permanganate consumption of the adiponitrile containing impurities oxidizable with potassium permanganate.

The optimum amount differs somewhat depending upon the types of the impurities contained in the starting adiponitrile, and therefore, it is desirable to check this by a simple preliminary test. If the amount is smaller than the lower limit of the range specified above, the effect obtained is not sufficient. If, on the other hand, it is larger than the upper limit, the amounts of impurities again increase as a result of side reactions.

The amounts of the impurities contained in adiponitrile can be measured by various methods such as high sensitivity gas-chromatography, the measurement of absorbance in the ultraviolet region, or the measurement of the freezing point. The simplest and effective method is one disclosed in U.S. Pat. 2,920,099 in which the amounts of the impurities are expressed in grams of potassium permanganate consumed per 100 g. of the sample in 6 N-sulfuric acid (to be abbreviated as potassium permanganate demand or KV value).

In the present invention, "the mole of potassium permanganate consumption of adiponitrile" means the potential amount in mols of $KMnO_4$ consumed by adiponitrile, and has the following relation to the KV value.

$$\text{Mols of KMnO}_4 \text{ consumption} = \frac{\text{Amount (g.) of adiponitrile used} \times \text{KV value}}{100 \times 158.04}$$

The amounts of cyanoimine and its derivatives can be most effectively measured by the colorimetric method using its diazonium salt of p-nitroaniline as a color former [see Maslennikov, J. of Appl. Chem. U.S.S.R. (1961), 2647]. The adiponitrile containing impurities oxidizable with potassium permanganate which can be advantageously purified by the process of this invention is, for example, a crude adiponitrile obtained by passing adipic acid and ammonia on a known dehydrating catalyst such as boron phosphate or silicagel containing phosphoric acid at an elevated temperature, for example at 250° to 450° C., the potassium permanganate demand of which is about 1% to 12%. Very impure crude adiponitrile having a potassium permanganate demand of 5% or more can also be purified by the process of this invention without any pretreatment. If desired, however, such crude adiponitrile may be distilled in advance to remove low boiling or high boiling impurities, and then subjected to the process of this invention.

Since the presence of water in a substantial amount reduces the treatment effect, the starting adiponitrile is dehydrated prior to use when it is to be treated at temperatures lower than the distillation temperature of water.

The treatment according to this invention may be performed either batchwise or continuously. For example, ice-cooled liquefied dinitrogen tetroxide or gaseous nitrogen peroxide is fed into crude adiponitrile, and the treatment may be carried out with stirring by the batch method. Or the treatment may be carried out continuously by flowing crude adiponitrile and nitrogen peroxide concurrently with each other in a reaction tube. Or the concurrent contact may be accomplished by using a multi-staged tower equipped with baffle plates. Other desired measures may be employed which can effect sufficient contact between crude adiponitrile and nitrogen peroxide.

When the treatment is carried out by blowing gaseous nitrogen peroxide, the exhaust gas becomes colored if the amount exceeds 3 mols based on each mole of potassium permanganate consumption of crude adiponitrile. Therefore, the suitable amount of nitrogen peroxide to be used can be easily determined.

The reaction temperature can be varied over a wide range, and even at room temperature, the reaction can be performed at a sufficiently high rate. By contact with nitrogen peroxide, the impurities contained in the crude adiponitrile which are oxidizable with potassium permanganate are converted selectively to non-volatile tar-like substances, and can be easily removed by subsequent distillation. Usually, temperatures from room temperature to 180° C. may be employed for the treatment according to this invention.

According to this invention, adiponitrile is unlikely to undergo undesirable side-reactions even at very high temperatures. Therefore, a considerably large temperature difference, for example between the inlet and the outlet of the treating zone, is permissible. Thus, a complicated and strict temperature control measure is not required, and the process can be carried out with great commercial advantage. This ease of temperature control is especially advantageous in the commercial practice of the process of this invention, in conjunction with the fact that the desired reaction can be carried out at a high rate even at low temperatures without the need for a catalyst.

The net time required for the reaction is less than 5 minutes, usually less than 2 minutes. The high rate of reaction and the broad range of applicable temperatures are among the characteristic features of the process of this invention, which are not seen in the conventional methods, for example, the nitric acid treating method, oxygen treating method or ozone treating method. Therefore, the reactor may be of extremely simple structure, and for example, a tubular gas-liquid mixer may be used.

The process of this invention does not require the use of catalyst at all and the reaction proceeds very rapidly absent a catalyst. When the nitrogen oxide comes into contact with crude adiponitrile, the reaction immediately occurs with the generation of heat. With the formation of non-volatile tar-like substances, the reaction mixture turns black. If desired, a small amount of a catalyst may be used, which is selected from the inorganic acid salts, organic acid salts, halides and acetylacetonates of manganese, iron, copper, cobalt, nickel and chromium, and ammonium metavanadate.

The adiponitrile treated with nitrogen peroxide is then distilled usually at reduced pressure. Black non-volatile tar-like substances remain as still residues, and purified adiponitrile is recovered. The still residues are removed from the bottom of the distillation still.

In this manner, purified adiponitrile can be recovered without substantial loss of adiponitrile. In order to obtain adiponitrile of higher purity, the adiponitrile so purified is subsequently treated with a small amount of an alkali such as alkali hydroxides, alkali carbonates or aqueous ammonia or with an ion-exchange resin to remove acidic substances, and subjected to rectification to cut off the initial fraction in an amount of 5 to 10%. This cut initial fraction may be recycled to the step of treating crude adiponitrile with nitrogen peroxide.

Nitrogen peroxide used in the present invention is commercially available at low cost, and is gaseous under ordinary use conditions. By using it, the substantial loss of adiponitrile can be avoided. The process of this invention makes it possible to obtain adiponitrile of low KV value and low cyanoimine content at a high rate of recovery.

The process of this invention will be further described specifically by the following examples and comparative examples.

EXAMPLE 1 AND COMPARATIVE EXAMPLE 1

Adiponitrile obtained by passing adipic acid and ammonia over a dehydrating catalyst was roughly distilled at 5 mm. Hg to give moisture-free adiponitrile having a KV value of 5.07 and a cyanoimine content of 5200 p.p.m. With stirring, 100 g. of this adiponitrile were maintained at 25° C., and 2.5 g. of liquid dinitrogen tetroxide were added dropwise in the course of 15 minutes. Stirring was continued for an additional 15 minutes. The molar ratio of dinitrogen tetroxide, calculated as nitrogen dioxide, to potassium permanganate consumption of adiponitrile is 1.7.

The resulting reaction liquor contained 11.7 mmols of inorganic acids, which means that 78% of the used dinitrogen tetroxide was consumed. Without distillation, the reaction liquor was poured into a slight excess of an aqueous solution of sodium hydroxide having a concentration of 5% by weight to stop the reaction. The product was separated, washed with water, and subjected to simple distillation using a Claisen flask. The amount of the main fraction obtained, its KV value, and its cyanoimine content are shown in Table 1 below.

For comparison, 100 g. of the same crude adiponitrile used above were maintained at 25° C. with stirring, and 6.0 g. of nitric acid of a concentration of 61% by weight were added dropwise in the course of 15 minutes. Stirring was continued for an additional 15 minutes. The reaction liquor contained 50.6 mmols of inorganic acids. When stirring was continued further for 1.5 hours, the inorganic acid content reached 50.2 mmols. This means that 86% of the nitric acid added remained unreacted. The reaction liquor was then poured into a slight excess of an aqueous solution of sodium hydroxide to stop the reaction. The product was separated, washed with water and subjected to simple distillation using a Claisen flask. The results are also shown in Table 1.

TABLE 1

| | Treating agent | Amount of main fraction (g.) | KV value of main fraction | Cyanoimine content of main fraction (p.p.m.) |
|---|---|---|---|---|
| Example 1 | Liquefied N₂O₄ | 86 | 0.39 | 25 |
| Comparative Example 1 | HNO₃ | 87 | 1.89 | 610 |

EXAMPLE 2 AND COMPARATIVE EXAMPLE 2

300 g. of crude adiponitrile having a purity of 93.5%, a KV value of 5.13 and a cyanoimine content of 5100 p.p.m. were heated to 150° C. with stirring, and nitrogen dioxide entrained in a stream of nitrogen flowing at a rate of 1500 ml./hour was blown into the adiponitrile for 70 minutes. The amount of the blown nitrogen dioxide was 9.0 g. This amount corresponded to 2.0 molar times the amount of consumption of potassium permanganate consumption of the starting crude adiponitrile. The resulting black reaction liquor was distilled at reduced pressure of 5 mm. Hg to form 280 g. of an adiponitrile fraction and 11.2 g. of a tar-like still residue. The purity of the adiponitrile fraction was 98.7%, and the rate of recovery was 98.5%. In order to remove acidic substances contained in the adiponitrile fraction, it was washed with 48 ml. of an aqueous solution of sodium hydroxide having a concentration of 2% by weight and then with 28 ml. of water. Then, the adiponitrile was rectified using a 30 cm. Widmer rectification tube to give 14 g. of an initial fraction, 261 g. of a main fraction, and 0.9 g. of a still residue. The initial fraction had a KV value of 0.34 and a cyanoimine content of 12 p.p.m. The main fraction had a KV value of 0.06 and a cyanoimine content of 9 p.p.m. The initial fraction was again distilled to remove several percent of low boiling substances, and recycled to the treatment of crude adiponitrile. The results are shown in Table 2.

For comparison, the above procedure was repeated except that molecular oxygen was used instead of nitrogen dioxide. The results are also shown in Table 2 below.

TABLE 2

| | Trating agent | Amount of main fraction (g.) | KV value of main fraction | Cyanoimine content of main fraction (p.p.m.) |
|---|---|---|---|---|
| Example 2 | NO₂+N₂ gas | 261 | 0.06 | 9 |
| Comparaitve Example 2. | O₂ gas | 260 | 0.46 | 750 |

EXAMPLE 3

300 g. of crude adiponitrile having a KV value of 8.98 and a cyanoimine content of 9600 p.p.m. which was obtained in the same way as in Example 1 were stirred, and 15.7 g. of liquid dinitrogen tetroxide were added dropwise thereto from a dropping funnel in the course of 20 minutes, followed by stirring for an additional hour. During this time, the reaction temperature was maintained at 50° C. The molar ratio of dinitrogen tetroxide, calculated as nitrogen dioxide, to potassium permanganate consumption of adiponitrile is 2.0. A part of the black reaction liquor obtained was analyzed. It was found that 84% of the dinitrogen tetroxide used was consumed by the reaction. The reaction liquor was then distilled at a reduced pressure of 5 mm. Hg to give 276 g. of an adiponitrile fraction and 13 g. of a still residue. The rate of recovery of this fraction was 97%.

The adiponitrile fraction was washed with 74 ml. of an aqueous solution of sodium hydroxide having a concentration of 3% by weight and then with 28 ml. of water. It was then rectified using a Widmer rectification tube to give 14 g. of an initial fraction, 256 g. of a main fraction and 0.4 g. of a still residue. Analysis showed that the initial fraction had a KV value of 0.58 and a cyanoimine content of 13 p.p.m., and the main fraction had a KV value of 0.16 and a cyanoimine content of 5 p.p.m.

EXAMPLE 4

300 g. of crude adiponitrile having a purity of 93.3%, a KV value of 5.35 and a cyanoimine content of 5200 p.p.m. were heated to 80° C. with stirring, and 9.6 g. of nitogen dioxide entrained in a stream of nitrogen flowing at a rate of 1600 ml./hour were blown into the adiponitrile in the course of 2.5 hours. The molar ratio of nitrogen dioxide to potassium permanganate consumption of the starting crude adiponitrile is 2.05. The black reaction liquor obtained was distilled at a reduced pressure of 5 mm. Hg to give 276.3 g. of an adiponitrile fraction and 14.8 g. of a still residue. The rate of recovery of this fraction was 97.4%. The adiponitrile fraction was then washed with 30 ml. of a 5% aqueous sodium hydroxide solution, and 28 ml. of water. It was then rectified using a Widmer rectification tube to give 14 g. of an initial fraction, 255 g. of a main fraction and 0.9 g. of a still residue. The main fraction had a KV value of 0.10 and a cyanoimine content of 3 p.p.m.

EXAMPLE 5

Moisture-free crude adiponitrile obtained by passing adipic acid and ammonia at elevated temperatures over a dehydrating catalyst and roughly distilling the product at 5 mm. Hg was used as a starting material. This crude adiponitrile had a purity of 97.8%, a KV value of 6.02 and a cyanoimine content of 9900 p.p.m.

A reaction tube with an inner diameter of 25 mm. was packed with 30 ml. of Raschig ring, and from its bottom, 10 ml./min. (9.6 g./min.) of crude adiponitrile, and $NO_2/N_2O_4$ entrained in a stream of $N_2$ flowing at a rate of 170 ml./min. were fed at 30° C. The reaction liquor was withdrawn from an overflow tube. The amount of adiponitrile held up in the reaction tube was 15 ml. and the average residence time was 90 seconds. The amount of $NO_2/N_2O_4$ fed was 18.6 g./hour, which corresponded to 1.85 molar times, calculated as $NO_2$, the amount of $KMnO_4$ consumption of the crude adiponitrile. With the initiation of feeding $NO_2/N_2O_4$ mixed gas, the reaction liquor was blackened. The temperature rose by the heat generated, and at 52° C., the reaction reached the steady state. A part of the reaction liquor was taken out, and after dissolving in water, titrated with alkali. It was found that 88% of the fed $NO_2/N_2O_4$ was consumed by the reaction. 240 g. of the reaction liquor were subjected to simple distillation at 5 mm. Hg. 6.3 g. of a non-volatile tar-like still residue was separated, and washed with 40 ml. of a 1.25% aqueous sodium hydroxide solution and then with 30 ml. of water to remove acidic substances. The product was rectified at 5 mm. Hg using a distillation flask equipped with a 30 cm. Widmer rectifying tube. As a result 21 g. of an initial fraction, 189 g. of a main fraction, and 3.9 g. of a still residue were attained. Analysis showed that the initial fraction had a KV value of 0.87 and a cyanoimine content of 208 p.p.m., and the main fraction had a KV value of 0.17 and a cyanoimine content of 16 p.p.m.

EXAMPLE 6

Using the same apparatus as used in Example 5, 10 ml./min. of the same crude adiponitrile as used in Example 5 and 2.4 l./min. of nitrose gas consisting of 0.48% NO, 5.92% $NO_2$, 2.64% $N_2O_4$, 0.26% $O_2$, 0.57% $H_2O$, and 85.1% $N_2$ (all percentages being by volume) were fed at room temperature (28° C.). The reaction liquor was withdrawn from the overflow tube. The average residence time in the reaction tube was 90 seconds. The molar ratio of $NO_2/N_2O_4$ fed, calculated as $NO_2$, to $KMnO_4$ consumption of the crude adiponitrile is about 2.9. With the initiation of feeding nitrose gas, the reaction liquor was blackened. The temperature rose with the heat generated, and at 47° C., the reaction reached the steady state. A part of the reaction liquor was taken out, and after dissolving in water, titrated with alkali. It was found that 87% of the $NO_2/N_2O_4$ in the nitrose gas was consumed by the reaction.

240 g. of the reaction liquor were subjected to simple distillation at 5 mm. Hg to separate 7.4 g. of a non-volatile tar-like still residue, and then washed with 30 ml. of a 2.0% aqueous sodium hydroxide solution and then with 20 ml. of water to remove acidic substances, followed by rectification in the same way as in Example 5. As a result 20.7 g. of an initial fraction, 195 g. of a main fraction and 3.6 g. of a still residue were obtained. Analysis showed that the initial fraction had a KV value of 0.67 and a cyanoimine content of 160 p.p.m., and the main fraction had a KV value of 0.13 and a cyanoimine content of 16 p.p.m.

COMPARATIVE EXAMPLE 3

The procedure of Example 6 was repeated except that 61% $HNO_3$ were used instead of the nitrose gas. 15.2 g. of 61% $HNO_3$ were added to 240 g. of the crude adiponitrile same as used in Example 6, and the mixture was stirred for 90 seconds at 30° C. The amount of nitric acid was ⅔ weight time the KV value of the starting material, calculated as 100% $HNO_3$. The color of the reaction liquor hardly changed from the initial yellow, and no heat was generated. The reaction liquor was washed with 240 ml. of an aqueous solution of sodium hydroxide having a concentration of 5% and then with 24 ml. of water, and then subjected to rectification at 5 mm. Hg using a distillation still equipped with a 30 cm. Widmer rectifying tube. As a result 24 g. of an initial fraction, 192 g. of a main fraction and 1.6 g. of a still residue were obtained. Analysis showed that the initial fraction had a KV value of 6.37 and a cyanoimine content of 1900 p.p.m., and the main fraction had a KV value of 1.62 and a cyanoimine content of 540 p.p.m.

EXAMPLE 7

A reaction tube with an inner diameter of 25 mm. was packed with 15 ml. of Raschig rings, and the position of an overflow tube was adjusted so that the average residence time of adiponitrile would be 45 seconds. The adiponitrile was preheated, and by heating the reaction tube the temperature of the reaction in the steady state was maintained at 95° C. Otherwise, the procedure and the conditions were the same as those used in Example 6.

A part of the reaction liquor was taken out, and after dissolving in water, titrated with alkali. It was found that 94% of $NO_2/N_2O_4$ in the nitrose gas fed was consumed by the reaction. 240 g. of the reaction liquor were subjected to simple distillation, and 6.1 g. of a tar-like still residue were separated. The product was then washed with 26 ml. of an aqueous solution of sodium hydroxide having a concentration of 1.15% by weight and with 20 ml. of water to separate and remove acidic substances, followed by rectification. As a result 21.4 g. of an initial fraction, 196 g. of a main fraction, and 3.6 g. of a still residue were obtained. Analysis showed that the initial fraction had a KV value of 0.50, and the main fraction had a KV value of 0.12.

COMPARATIVE EXAMPLE 4

The same experiment as in Example 7 was conducted batchwise using 61% $HNO_3$ instead of the nitrose gas. 15.2 g. of 61% $HNO_3$ were added to 240 g. of the crude adiponitrile as used in Example 7, and the mixture was stirred for 45 seconds at 100 to 108° C. The amount of nitric acid used was ⅔ weight times the KV value of the starting material, calculated as 100% $HNO_3$. The color of the reaction liquor, which was initially yellow, turned dark brown. The reaction liquor was washed with 240 ml. of an aqueous solution of sodium hydroxide having a concentration of 5% and 24 ml. of water, followed by rectification in the same way as in Example 7. As a result 20.4 g. of an initial fraction, 190 g. of a main fraction, and 2.4 g. of a still residue were obtained. Analysis showed that the initial fraction had a KV value of 1.44, and the main fraction had a KV value of 0.22.

EXAMPLE 8

A reaction tube with an inner diameter of 25 mm. was packed with 4 ml. of Raschig rings (4 mm. $\phi$ x 5 mm.), and the position of the overflow tube was adjusted so that the average residence time of adiponitrile would be 12 seconds. The adiponitrile was preheated, and by heating the reaction tube, the temperature of the reaction in the steady state was maintained at 125° C. Otherwise, the procedure and the conditions were the same as those used in Example 5.

The amount of $NO_2/N_2O_4$ fed entrained in a stream of nitrogen gas flowing at 250 ml./min. was 24 g./hour, which corresponded to 2.2 molar times, calculated as $NO_2$, the amount of $KMnO_4$ consumption of the crude adiponitrile (10 ml./min.). A part of the reaction liquor was taken out, and after dissolving in water, titrated with alkali. It was found that 94% of the $NO_2/N_2O_4$ fed was already consumed. 240 g. of the reaction liquor were subjected to simple distillation at 5 mm. Hg, and 5.7 g. of a tar-like still residue were separated. Then, the product was washed with 30 ml. of a 2.0% aqueous sodium hydroxide solution and then with 20 ml. of water to remove acidic substances, followed by rectification in the same way as in Example 5. As a result 23 g. of an initial fraction, 194 g. of a main fraction, and 2.6 g. of a still residue were obtained. Analysis showed that the initial fraction had a KV value of 0.53 and a cyanoimine content of 44 p.p.m., and the main fraction had a KV value of 0.15 and a cyanoimine content of 10 p.p.m.

EXAMPLE 9

400 g. of crude adiponitrile having a purity of 97.5%, a KV value of 4.30 and a cyanoimine content of 4200 p.p.m. were heated to 100° C. with stirring, and 1.2 l./min. of $N_2O_3$ gas consisting of 4.5 vol. percent NO, 4.5 vol. percent $NO_2$ and 91 vol. percent of $N_2$ was bubbled into the adiponitrile liquid for 100 minutes. The temperature rose to 103° C. as a result of generation of heat, and the reaction liquor was blackened. The molar ratio of $NO_2$ to $KMnO_4$ consumption of the starting adiponitrile is 2.1. The resulting reaction liquor was subjected to simple distillation to give 389 g. of an adiponitrile fraction (purity 98.7%, rate of recovery 98.5%) and 9.2 g. of a tar-like still residue. In order to remove acidic substances contained in the adiponitrile fraction, the reaction liquor was washed with 120 ml. of a 1.4% aqueous sodium hydroxide solution and then with 40 ml. of water, followed by rectification by means of a distillation still equipped with a 30 cm. Widmer rectification tube to give 24 g. of an initial fraction, 348 g. of a main fraction and 3.0 g. of a still residue. Analysis showed that the initial fraction had a KV value of 1.98 and a cyanoimine content of 53 p.p.m., and the main fraction had a KV value of 0.18 and a cyanoimine content of 16 p.p.m.

For comparison, the above procedure was repeated except that pure NO gas or $O_2$ was used instead of $N_2O_3$ gas, and the treatment was conducted for 6 hours at 100–110° C. Both the KV value and the cyanoimine content of the resulting product were not substantially reduced.

EXAMPLE 10

Using the same apparatus as used in Example 5, 10 ml./min. of the same crude adiponitrile as used in Example 5 and $NO_2/N_2O_4$ entrained in a stream of nitrogen gas flowing at 125 ml./min. were fed at 30° C., and the reaction liquor was withdrawn from the overflow tube. The average residence time of adiponitrile in the reaction tube was 90 seconds. The amount of $NO_2/N_2O_4$ fed was 10.5 g./hour, which corresponded to 1.04 molar times, calculated as $NO_2$, the amount of $KMnO_4$ consumption of the starting crude adiponitrile. By the blowing of the $NO_2/N_2O_4$ gas, the reaction liquor was blackened. As a result of generation of heat, the temperature rose, and at 47° C., the reaction reached the steady state. A part of the reaction liquor was taken out, and after dissolving in water, titrated with alkali. It was found that 86% of the fed $NO_2/N_2O_4$ gas was consumed. 240 g. of the reaction liquor were subjected to simple distillation at 5 mm. Hg to separate 5.5 g. of a tar-like non-volatile still residue, and then washed with 34 ml. of a 2% aqueous sodium hydroxide solution and then with 23 ml. of water. The product was rectified in the same way as in Example 5 to give 21 g. of an initial fraction, 195 g. of a main fraction, and 2.7 g. of a still residue. Analysis showed that the initial fraction had a KV value of 0.81 and a cyanoimine content of 20 p.p.m., and the main fraction had a KV value of 0.16 and a cyanoimine content of 3 to 4 p.p.m.

What is claimed is:

1. A process for purifying a crude adiponitrile obtained by passing adipic acid and ammonia over a dehydration catalyst at an elevated temperature containing impurities oxidizable with potassium permanganate, which comprises treating said adiponitrile with 1 to 3 mols of gaseous $NO_2$, in the form of the equilibrium mixture $2NO_2 \rightleftarrows N_2O_4$, the equilibrium mixture $NO_2+NO \rightleftarrows N_2O_3$ or nitrose gas obtained by the vapor phase oxidation of ammonia, based on each mole of potassium permanganate consumption of said adiponitrile at a temperature of from room temperature to 180° C., and thereafter recovering purified adiponitrile by distillation.

2. The process of claim 1 wherein said gaseous $NO_2$ is diluted with an inert gas.

3. The process of claim 1 wherein said crude adiponitrile has a potassium permanganate demand of about 1% to 12%.

4. The process of claim 1 wherein said impurities include 1-imino-2-cyanocyclopentane.

References Cited

UNITED STATES PATENTS

| 2,305,103 | 12/1942 | Osgood | 260—465.8 R |
| 2,920,099 | 1/1960 | Ringwald | 260—465.8 R |
| 3,496,212 | 2/1970 | Davison | 260—465.8 R X |

JOSEPH P. BRUST, Primary Examiner

U.S. Cl. X.R.

260—464, 465.8 R